(12) United States Patent
Chu (10) Patent No.: US 11,413,827 B2
(45) Date of Patent: Aug. 16, 2022

(54) EQUIPMENT FOR MANUFACTURING TRAMPOLINE AND METHOD FOR MANUFACTURING TRAMPOLINE

(71) Applicant: Pin-Chieh Chu, Taichung (TW)

(72) Inventor: Pin-Chieh Chu, Taichung (TW)

( * ) Notice: Subject to any disclaimer, the term of this patent is extended or adjusted under 35 U.S.C. 154(b) by 199 days.

(21) Appl. No.: 16/828,468

(22) Filed: Mar. 24, 2020

(65) Prior Publication Data

US 2021/0299970 A1  Sep. 30, 2021

(51) Int. Cl.
*B29C 65/08* (2006.01)
*A63B 5/11* (2006.01)
*B29C 65/00* (2006.01)
*B29C 65/78* (2006.01)
*B29L 31/52* (2006.01)

(52) U.S. Cl.
CPC .............. *B29C 65/08* (2013.01); *A63B 5/11* (2013.01); *B29C 65/7841* (2013.01); *B29C 66/729* (2013.01); *B29C 66/84* (2013.01); *B29L 2031/52* (2013.01)

(58) Field of Classification Search
CPC ... B29C 65/08; B29C 65/7841; B29C 66/729; B29C 66/84; A63B 5/11; B29L 2031/52
See application file for complete search history.

(56) References Cited

U.S. PATENT DOCUMENTS

| | | | | |
|---|---|---|---|---|
| 4,519,493 A | * | 5/1985 | Dyer | B65G 47/244 104/35 |
| 5,170,678 A | * | 12/1992 | Wawrzyniak | B23Q 16/04 269/73 |
| 5,784,932 A | * | 7/1998 | Gilberti | B23Q 15/26 108/22 |
| 6,829,967 B1 | * | 12/2004 | Kemp | E21B 19/164 81/57.14 |
| 2005/0227812 A1 | * | 10/2005 | James | A63B 5/11 482/27 |
| 2016/0177501 A1 | * | 6/2016 | Warnock, II | D06M 23/14 156/64 |
| 2020/0094094 A1 | * | 3/2020 | Zhu | A63B 5/11 |

* cited by examiner

*Primary Examiner* — Michael N Orlando
*Assistant Examiner* — Christopher W Raimund
(74) *Attorney, Agent, or Firm* — Muncy, Geissler, Olds & Lowe, P.C.

(57) ABSTRACT

An equipment for manufacturing trampoline includes a rack, a rotation seat, a supporting platform, a plurality of fixing members, a driving member, a driving assembly, and at least one welding device. The rotation seat has a bearing rotatable with respect to the rack. The supporting platform is connected to the bearing. The fixing members are detachably disposed on the supporting platform. The driving member surrounds the supporting platform and is linked-up with the supporting platform. The driving assembly is connected to the driving member.

17 Claims, 15 Drawing Sheets

FIG. 16

EQUIPMENT FOR MANUFACTURING TRAMPOLINE AND METHOD FOR MANUFACTURING TRAMPOLINE

BACKGROUND OF THE INVENTION

Field of the Invention

The present invention relates to an equipment for manufacturing trampoline and a method for manufacturing trampoline.

DESCRIPTION OF THE PRIOR ART

Generally, when manufacturing a trampoline, the flexible cloth is sewn onto a ring member manually, and then the ring member is installed onto a rack. However, the flexible cloth is easy to separate from the ring body after use, and the sewing process is laborious to increase the cost and to reduce the efficiency of manufacturing. Thus, the conventional trampoline is usually expensive.

SUMMARY OF THE INVENTION

The main object of the present invention is to provide an equipment for manufacturing trampoline and a method for manufacturing trampoline to manufacture trampoline quickly and automatically. In addition, the trampoline has a stronger structure.

To achieve the above and other objects, the equipment for manufacturing trampoline of the present invention includes a rack, a rotation seat, a supporting platform, a plurality of fixing members, a driving member, a driving assembly, and a welding device. The rotation seat has a bearing which is rotatable with respect to the rack. The supporting platform is connected to the bearing and is rotatable with the bearing when the bearing rotates. The fixing members are detachably disposed on the supporting platform and are arranged circularly. Each of the fixing members includes two clamping members for clamping a flexible cloth therebetween. The driving member is arranged around the supporting platform and is linked-up with the supporting platform. The driving assembly has a rotation motor. A rotation axle of the rotation motor is connected to the driving member so as to drive the driving member to rotate. The welding device is adapted for welding the two clamping members with the flexible cloth together.

To achieve the above and other objects, the method for manufacturing trampoline of the present invention uses the equipment for manufacturing trampoline mentioned above and includes steps of: preparing a flexible cloth and placing the flexible cloth on supporting platform, clamping a fringe of the flexible cloth by the two clamping members of each of the fixing members; the rotation motor driving the supporting platform to rotate by the driving member to make the welding device to correspond to one of the fixing members, the fixing member is welded to connect the two clamping members and the flexible cloth together.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Please refer to FIG. 1 to FIG. 16, the equipment to manufacture trampoline of the present invention includes a rack 1, a rotation seat 2, a supporting platform 3, a plurality of fixing members 4, a driving member 5, a driving assembly 6, and at least one welding device 7.

The rotation seat 2 has a bearing 21 which is rotatable with respect to the rack 1.

The supporting platform 3 is connected to the bearing 21 and is rotatable with the bearing 21 when the bearing 21 rotates.

The fixing members 4 are detachably disposed on the supporting platform 3 and are arranged circularly. Each of the fixing members 4 includes two clamping members 41 for clamping a flexible cloth 9 therebetween.

The driving member 5 is arranged around the supporting platform 3 and is linked-up with the supporting platform 3.

The driving assembly 6 has a rotation motor 61. A rotation axle of the rotation motor 61 is connected to the driving member 5 so as to drive the driving member 5 to rotate. Thus, the rotation axle of the rotation motor 61 and the supporting platform 3 are linked-up. Compared with the mechanism that the supporting platform is driven by rotating the bearing, the mechanism that the rotation axle of the rotation motor 61 and the driving member 5 are linked-up needs smaller torsion. Thus, the rotation motor 61 having smaller output is sufficient here to rotate the supporting platform 3.

The at least one welding device 7 is adapted for welding the two clamping members 41 with the flexible cloth 9 together. In the present embodiment, the at least one welding device 7 includes one said welding device 7.

The present invention further provides a method to manufacture trampoline using the equipment mentioned above. The method includes the following steps. Place the flexible cloth 9 on the supporting platform 3, and clamp the fringe of the flexible cloth 9 by the two clamping members 41 of the fixing member 4. The rotation motor 61 drives the supporting platform 3 to rotate via the driving member 5, and the welding device 7 corresponds to one of the fixing members 4. Weld the clamping members 41 of the fixing member 4 to the flexible cloth 9 to fix them. After welding one of the fixing members 4, the rotation motor 61 continues to rotate to make the welding device 7 to correspond to another one of the fixing members 4 for welding that fixing member 4. After all the fixing members 4 are welded, the flexible cloth 9 with the fixing members 4 can be detached from the supporting platform 3 to dispose on the trampoline rack. Thus, the trampoline can be manufactured automatically and quickly, and the flexible cloth 9 and the fixing members 4 are fixed by welding to have a stronger structure.

Preferably, the chain 51 surrounds the driving gear 62 so that the driving gear 62 is engaged with an inner side of the chain 51. The driving assembly 6 further includes two driven gears 63. The driving gear 62 is located between the two driven gears 63. A radial distance between the driving gear 62 and the bearing 21 is larger than a radial distance between each of the driven gears 63 and the bearing 21. The two driven gears 63 are engaged with the chain 51 at an outer side of the chain 51 respectively. The two driven gears 63 can increase the ratio of the chain 51 surrounding the supporting platform 3 so that the chain 51 can be engaged with more said toothed portions 31 in order to reduce the force that the chain 51 receives. In the present embodiment, the driving assembly 6 further includes a first lifting device 64 and a first moving device 65 for moving the rotation motor 61 with respect to the supporting platform 3 vertically and radially. The first moving device 65 can adjust the tension of the chain 51 to prevent the chain from detaching.

Specifically, a ring-shaped guiding face 11 is formed on a top of the rack 1. A plurality of guiding posts 32 facing the rack 1 are disposed on the supporting platform 3 and extend along a rotation axis of the bearing 21. Each of the guiding posts 32 has a rolling member 321 at an end thereof. The rolling members 321 abut against the guiding face 11 respectively so that the periphery of the supporting platform 3 can keep horizontal and prevent from deformation.

In the present embodiment, a receiving space 12 is formed at a center of the rack 1. The rotation seat 2 is received in the receiving space 12. A plurality of connecting legs 22 extending radially are arranged at a bottom of the rotation seat 2. The connecting legs 22 are connected to the rack 1 so that the rotation seat 2 and the supporting platform 3 may not move with respect to the rack 1.

In the present embodiment, the supporting platform 3 further includes a ring-shaped platform plate 33 and a plurality of supporting members 34. The supporting members 34 are arranged radially. An inner end of each of the supporting members 34 is connected to the bearing 21. An outer end of each of the supporting members 34 is connected to the platform plate 33. The fixing members 4 are disposed on the platform plate 33. Specifically, the platform plate 33 is assembled by a plurality of arc plates 331. Any two adjacent ones of the arc plates 331 are connected to one of the supporting members 34. More specifically, the supporting platform 3 includes a plurality of sector plates 35. Each of the sector plates 35 is sector-shaped. The sector plates 35 form a circular plate. Any two adjacent ones of the sector plates 35 are connected to an end one of the supporting members 34 remote from the platform plate 33. A radial size of the platform plate 33 is larger than a radial size of the circular plate assembled by the sector plates 35. The sector plates 35 are adapted for supporting the flexible cloth 9 to ensure that the flexible cloth 9 is spread out smoothly. Besides, the supporting platform 3 further includes a circular connecting plate 36. An outer periphery of the connecting plate 36 is engaged with inner ends of the sector plates 35. The sector plates 35 and the supporting members 34 are connected to the bearing 21.

Preferably, the supporting platform 3 further includes a linking member 37. The linking member 37 surrounds the rotation seat 2. The linking member 37 is connected to an end of the platform plate 33 remote from the supporting members 34. The toothed portions 31 are arranged around the linking member 37. When the chain 51 drives the linking member 37, the linking member 37 drives the platform plate 33 to rotate. Besides, the linking member 37 has a plurality of connecting members 371.

The connecting members 371 extend along the rotation axis of the bearing 21 and bend radially to abut against and connect to the platform plate 33.

That is, the platform plates 33, the supporting members 34, the sector plates 35, the connecting plates 36 are detachably fixed to be able to be dismantled for transporting. Thus, the cost of transporting is reduced.

Figure 13:
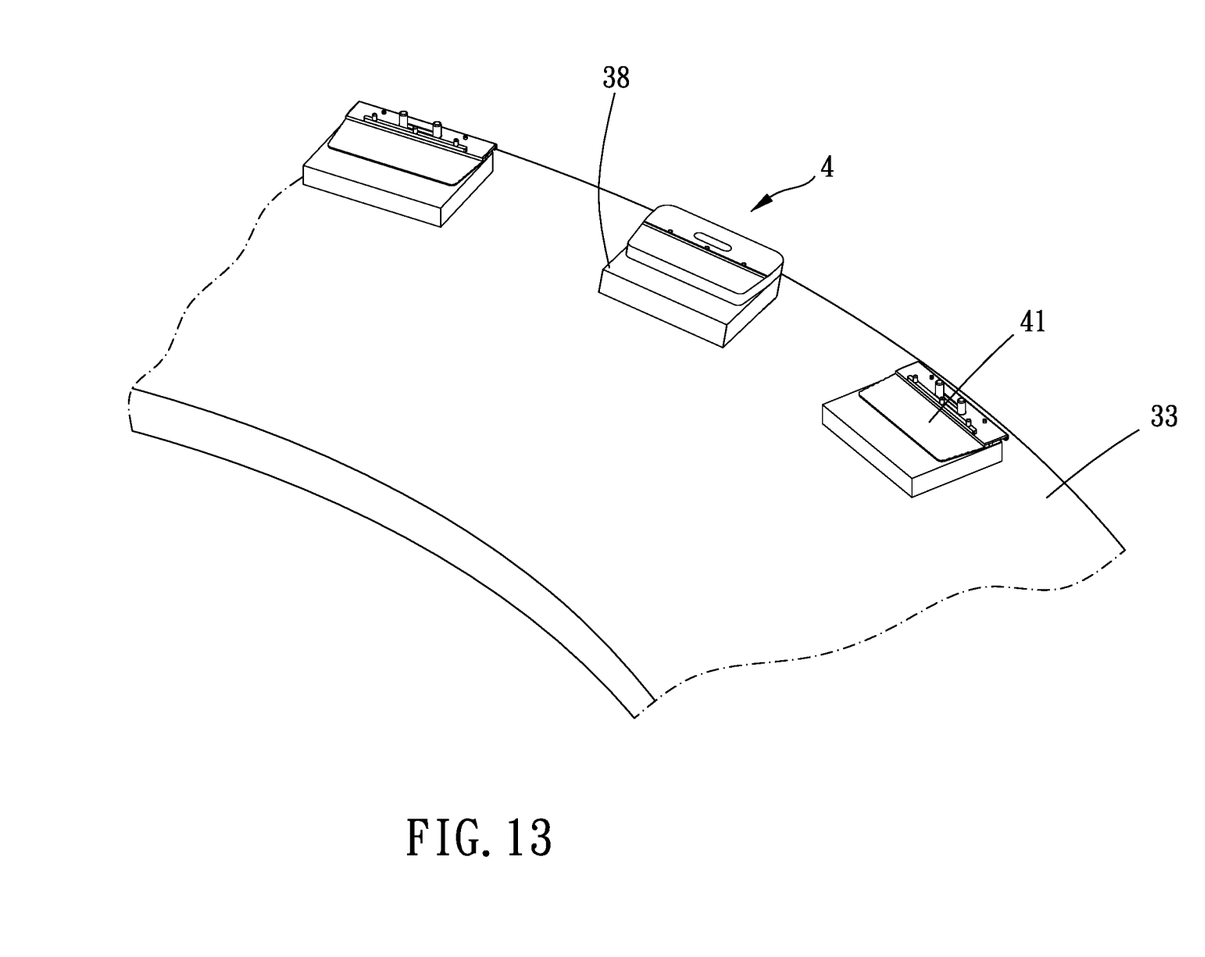
FIG. 13 is a partial illustration of the present invention.
Figure 14:
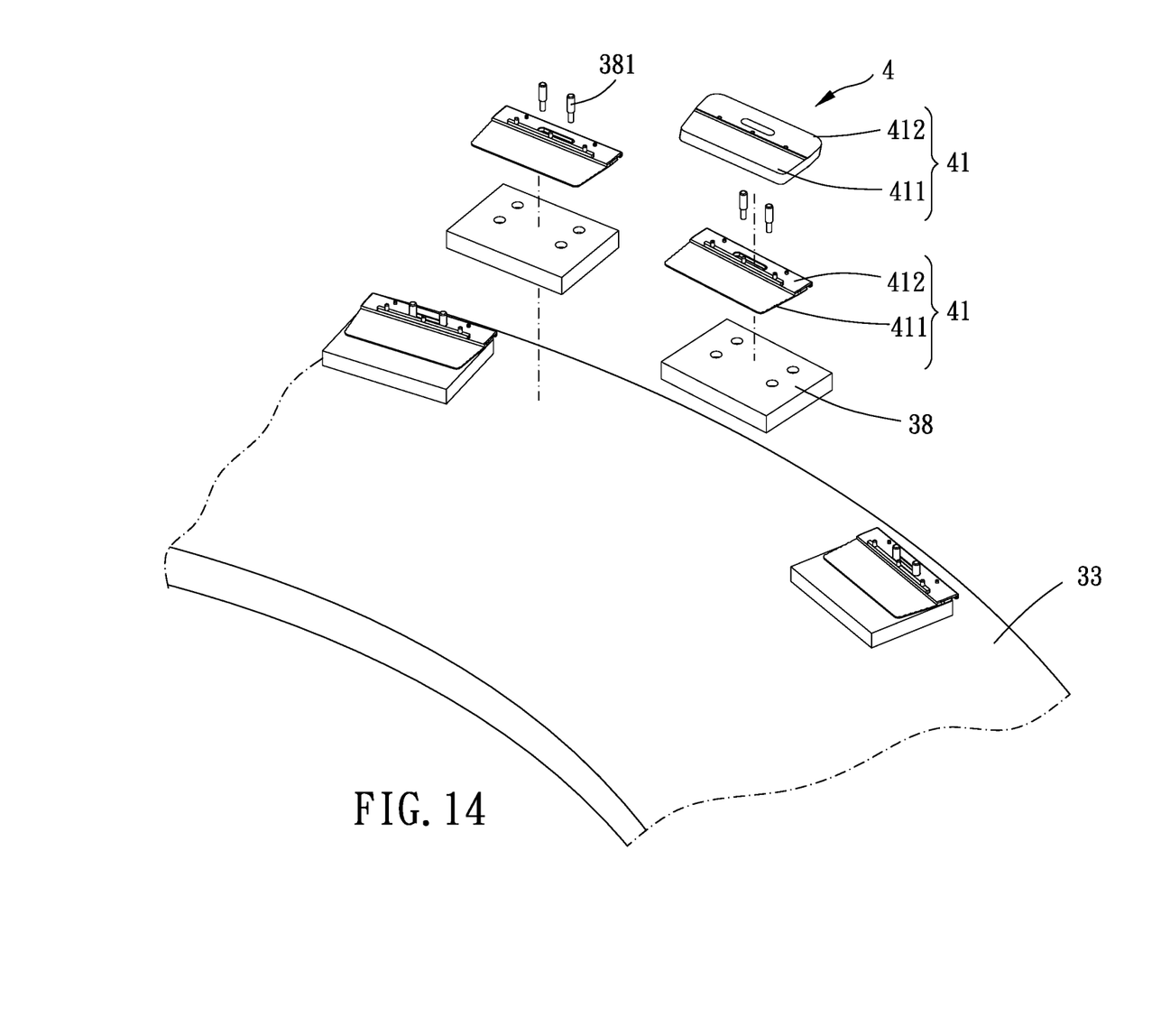
FIG. 14 is a breakdown drawing of FIG. 13.
Figure 15:
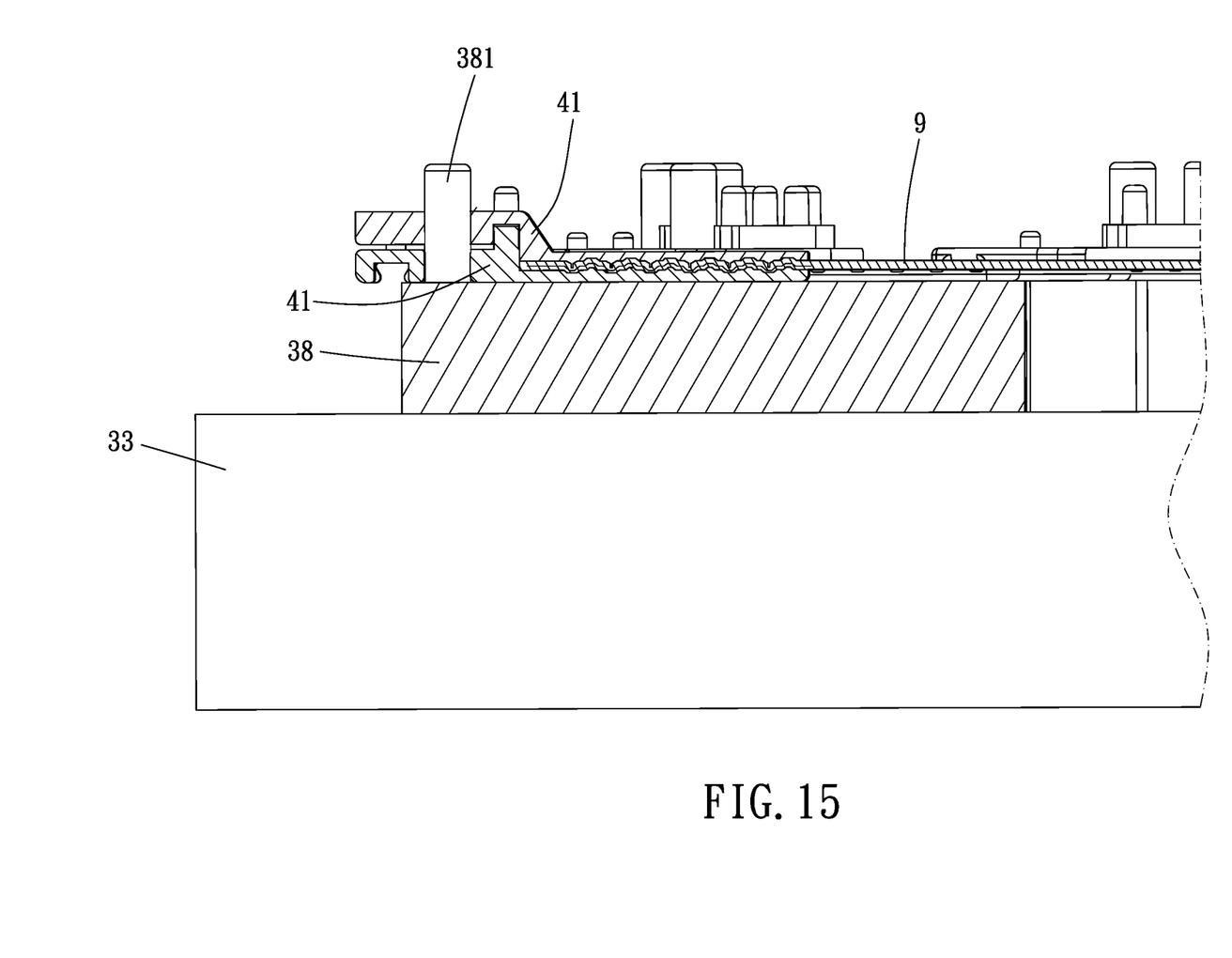
FIG. 15 is a lateral cross-section of FIG. 13.

Please refer to the FIG. 13 to FIG. 15, the supporting platform 3 has a plurality of jigs 38. In the present embodiment, the jigs 38 are disposed on the platform plate 33. The jigs 38 are arranged circularly. At least one pin member 381 is inserted through the two clamping members 41 of the fixing member 4 into the jigs 38 to protect the supporting platform 3 from damaging during welding.

Each of the two clamping members 41 of the fixing member 4 includes a clamping portion 411 and a positioning portion 412 which are integrally connected. The at least one pin member 381 is inserted through the positioning portions 412 of the two clamping members 41. A face of each of the clamping portion 411 facing the other one of the clamping portion 411 is formed with a wavy structure to provide larger friction to clamp the flexible cloth 9 before the two clamping members 41 of the fixing member 4 are welded.

Figure 1:
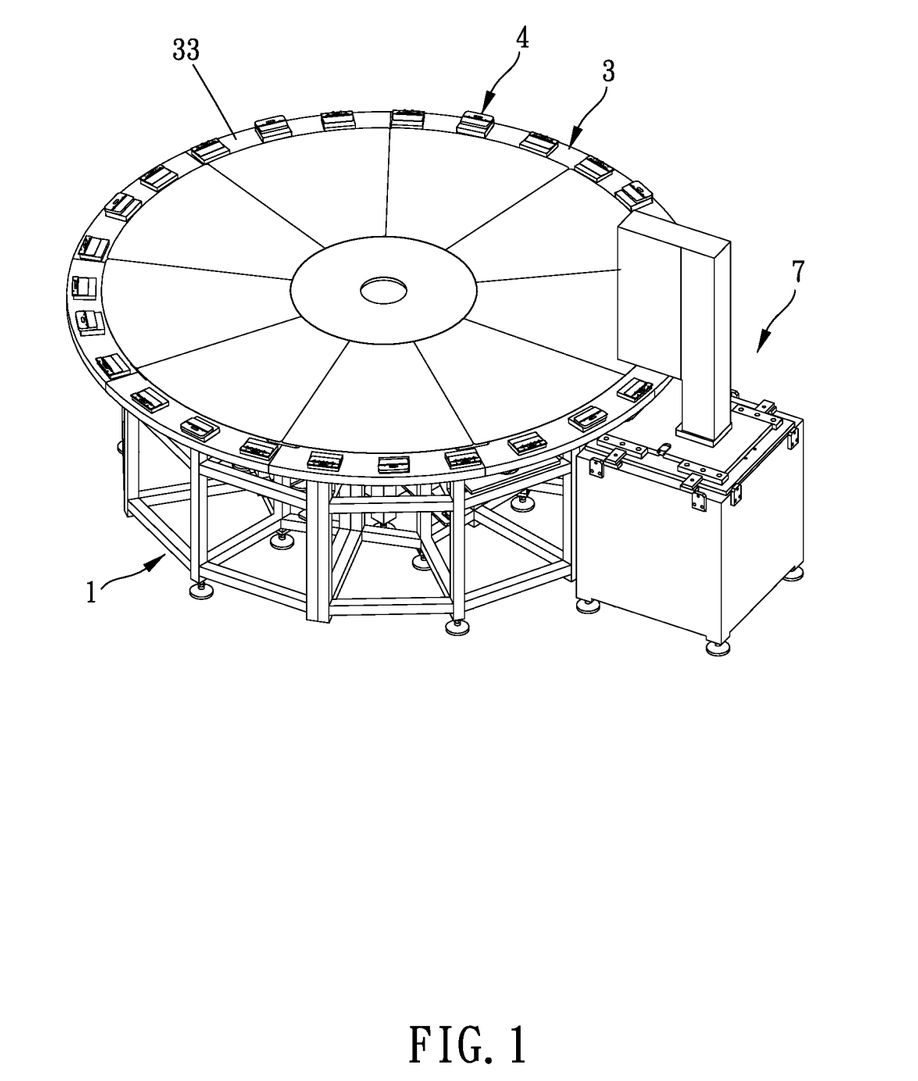
FIG. 1 is a stereogram of the present invention.
Figure 2:
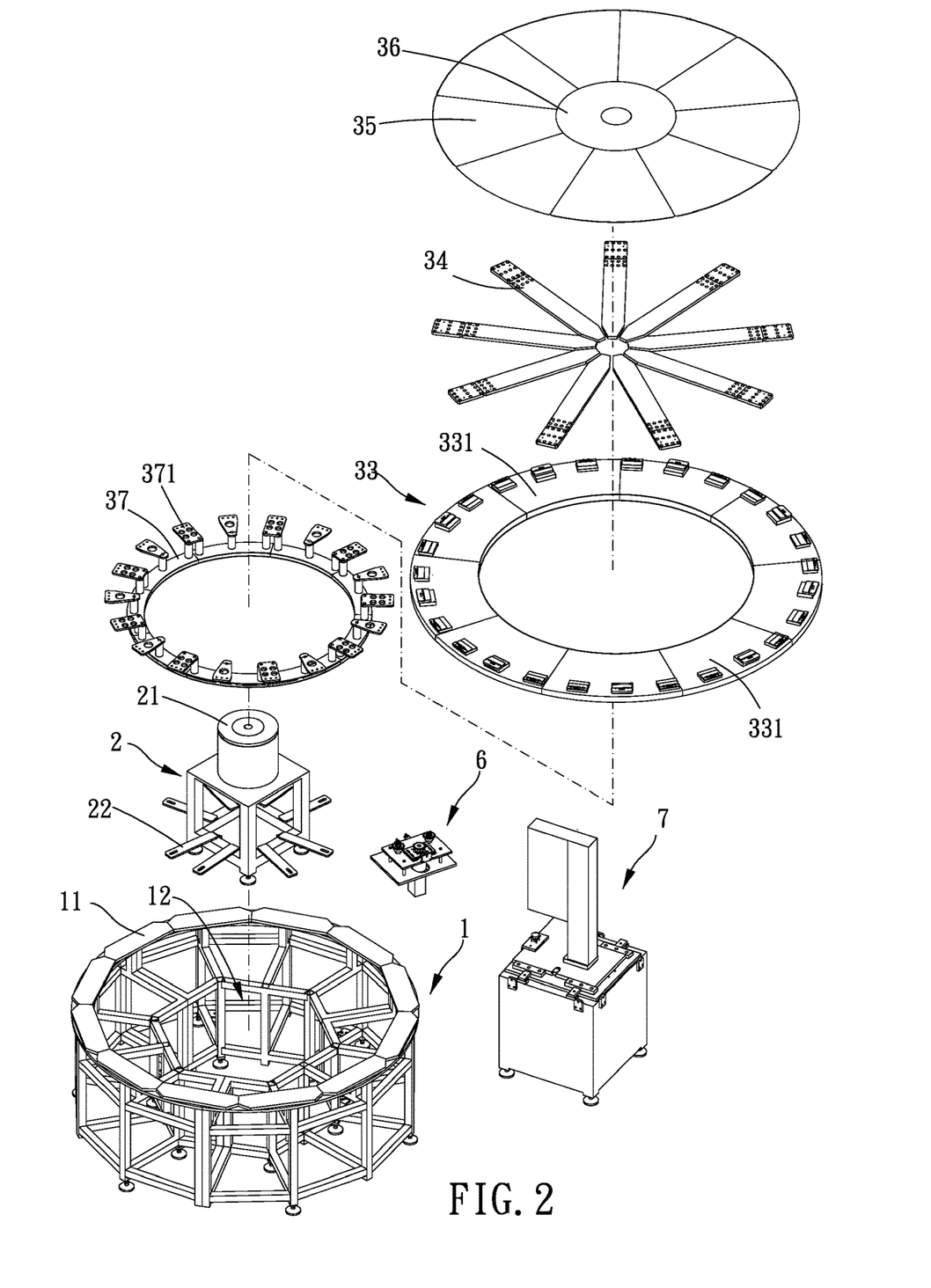
FIG. 2 is a breakdown drawing of the present invention.
Figure 3:
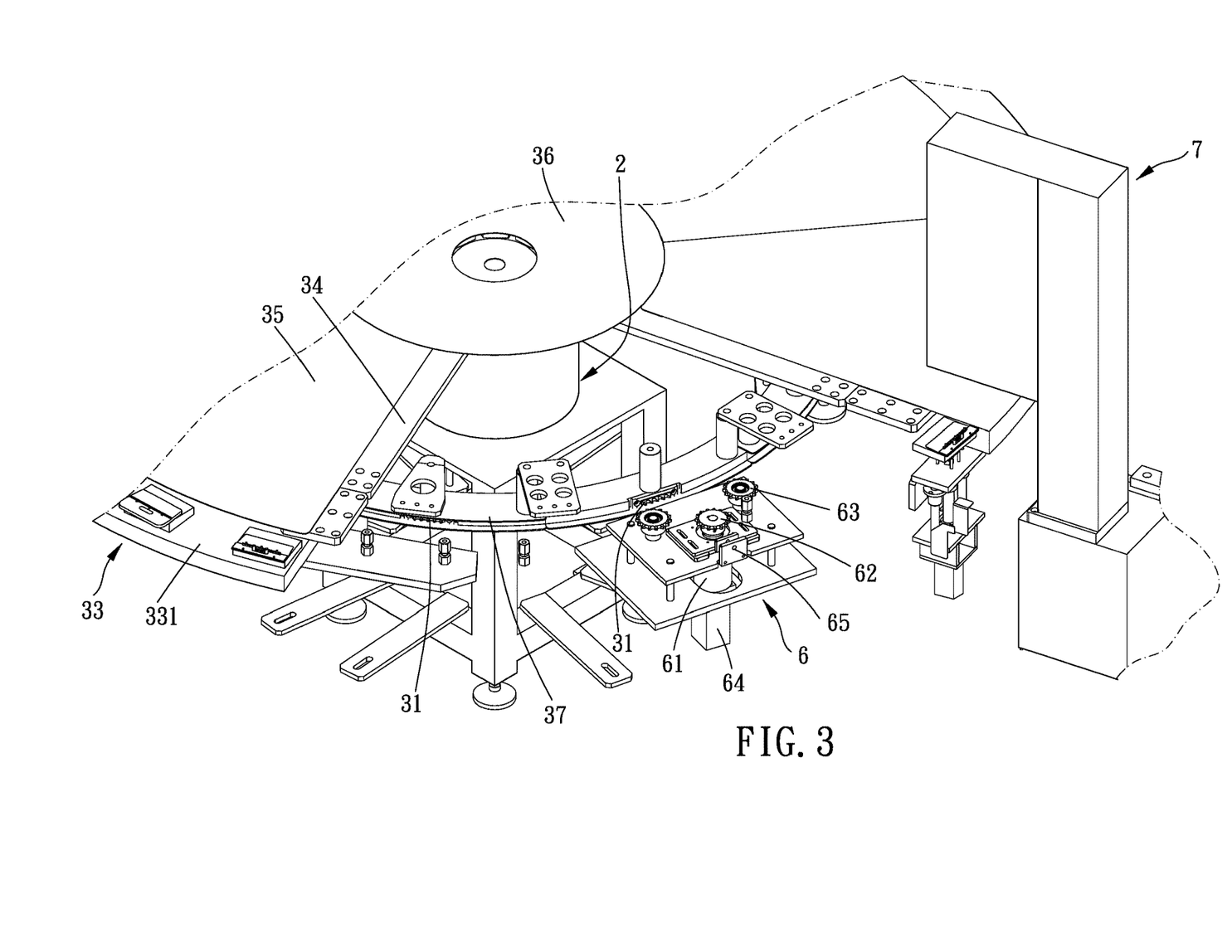
FIG. 3 is a partial breakdown drawing of the present invention.
Figure 4:
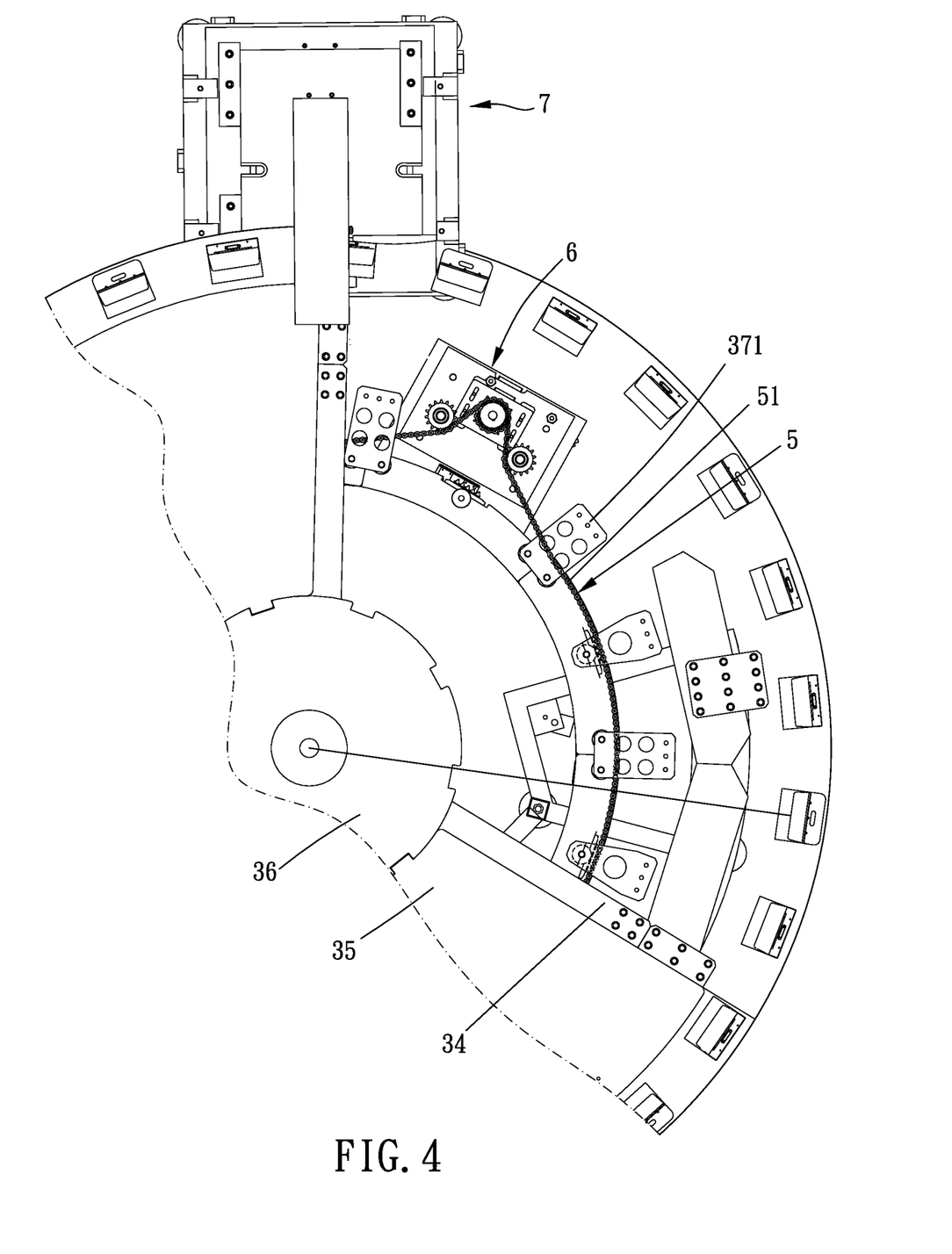
FIG. 4 is a top view of FIG. 3.
Figure 5:
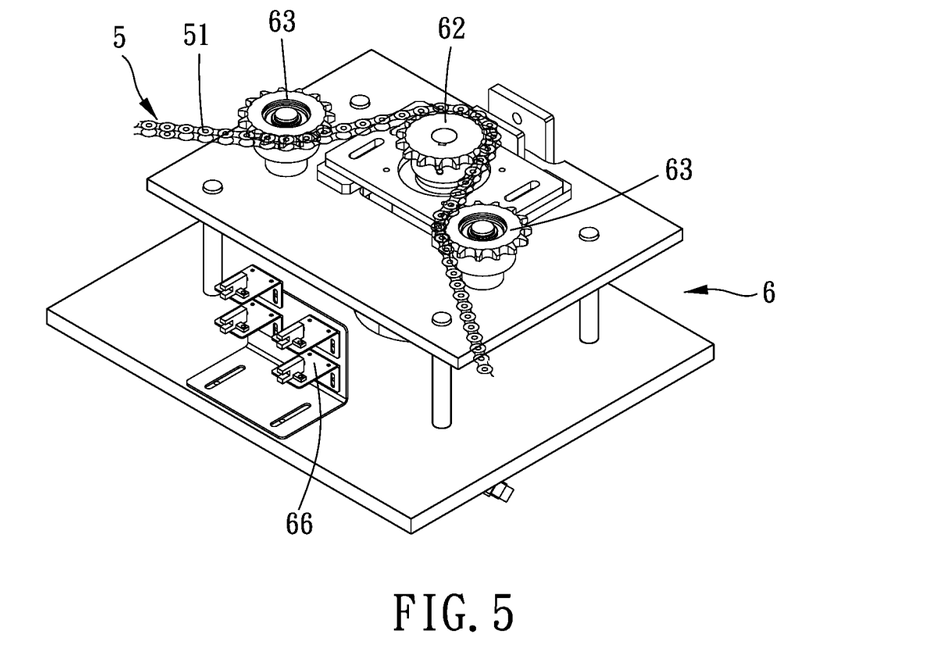
FIG. 5 is a stereogram showing a driving assembly of the present invention.
Figure 6:
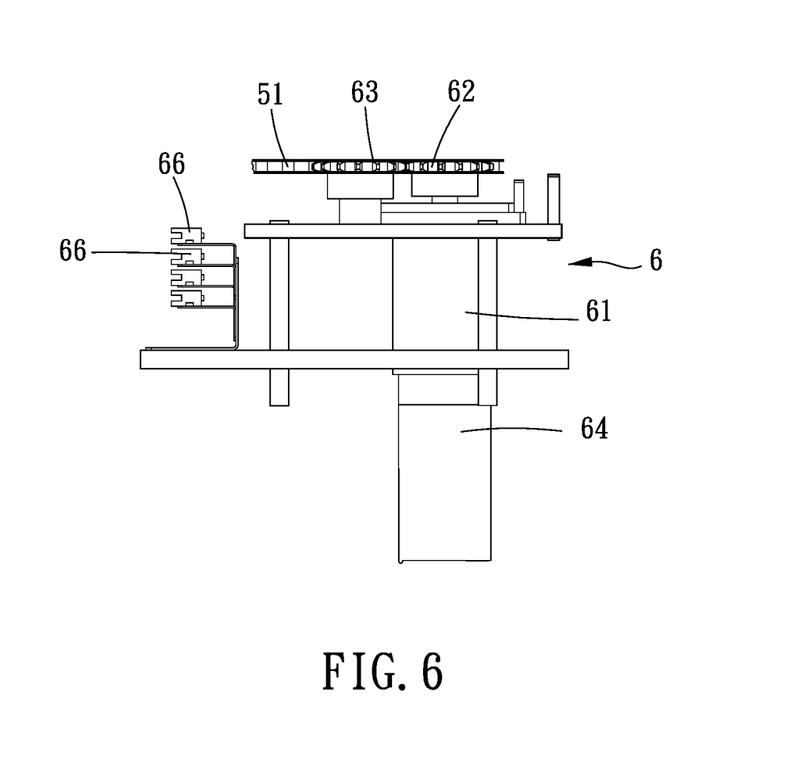
FIG. 6 is a lateral view of FIG. 5.
Figure 7:
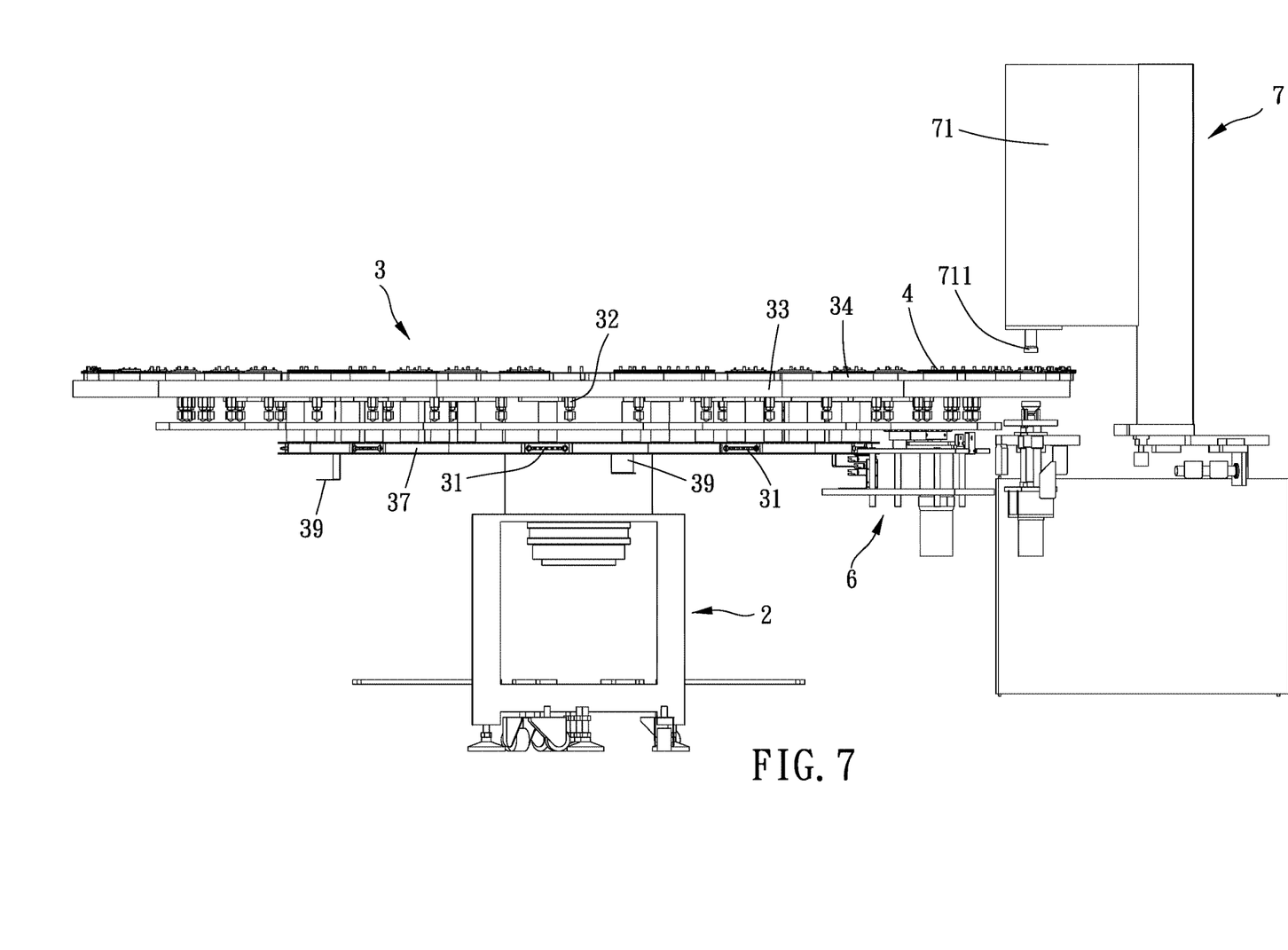
FIG. 7 is a lateral view of the present invention.
Figure 8:
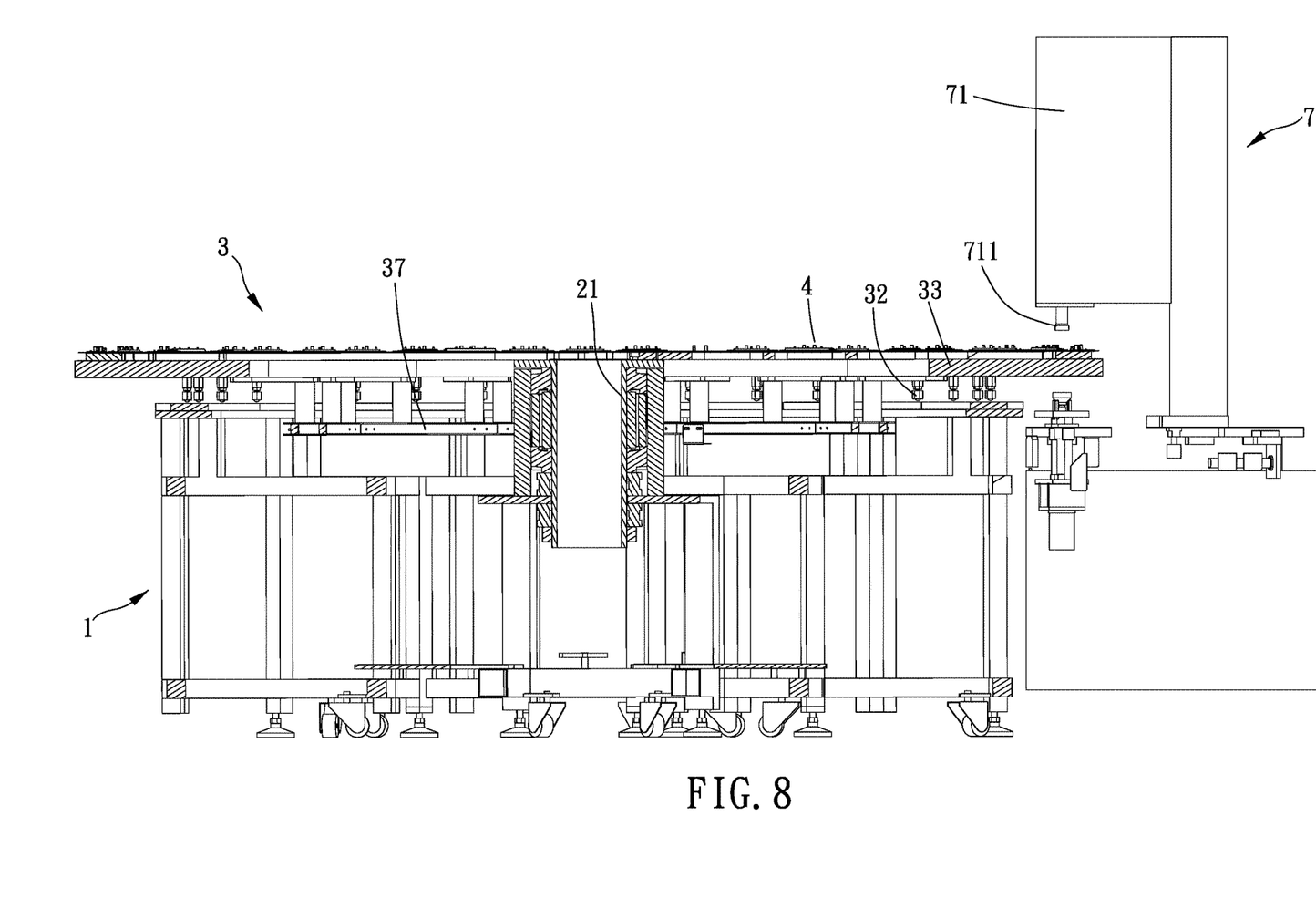
FIG. 8 is a lateral cross-section pf the present invention.
Figure 9:
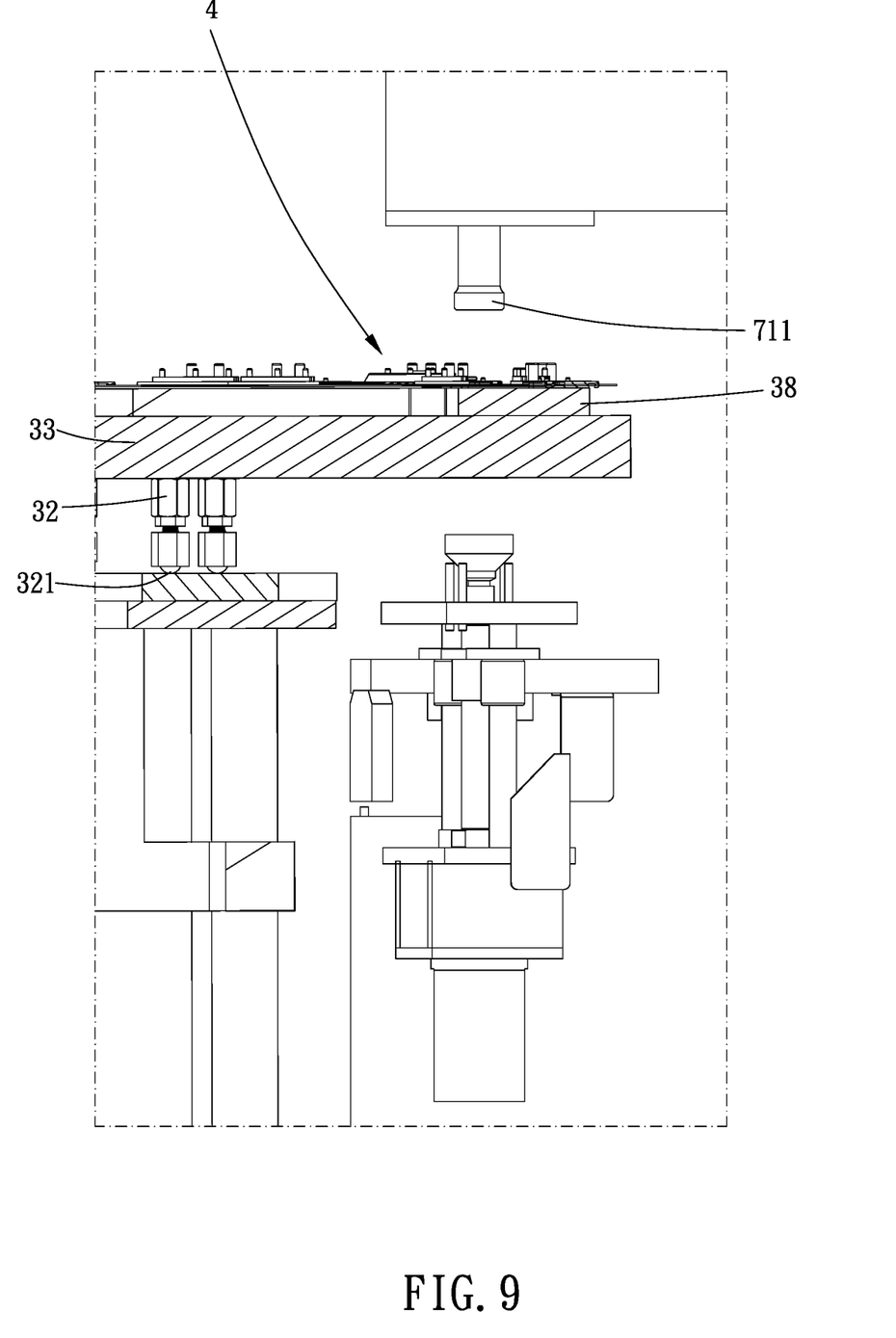
FIG. 9 is a partial enlargement of FIG. 8.
Figure 10:
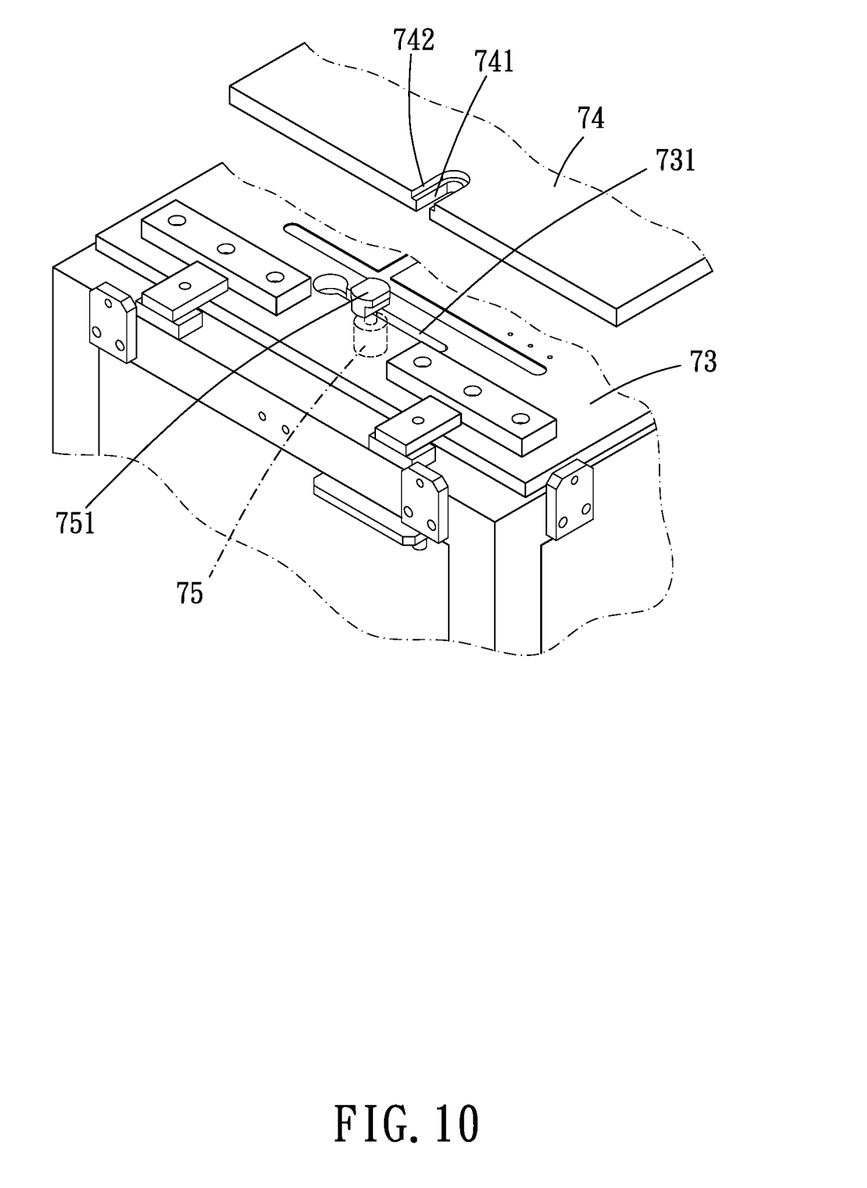
FIG. 10 is a partial breakdown drawing showing a welding device of the present invention.
Figure 11:
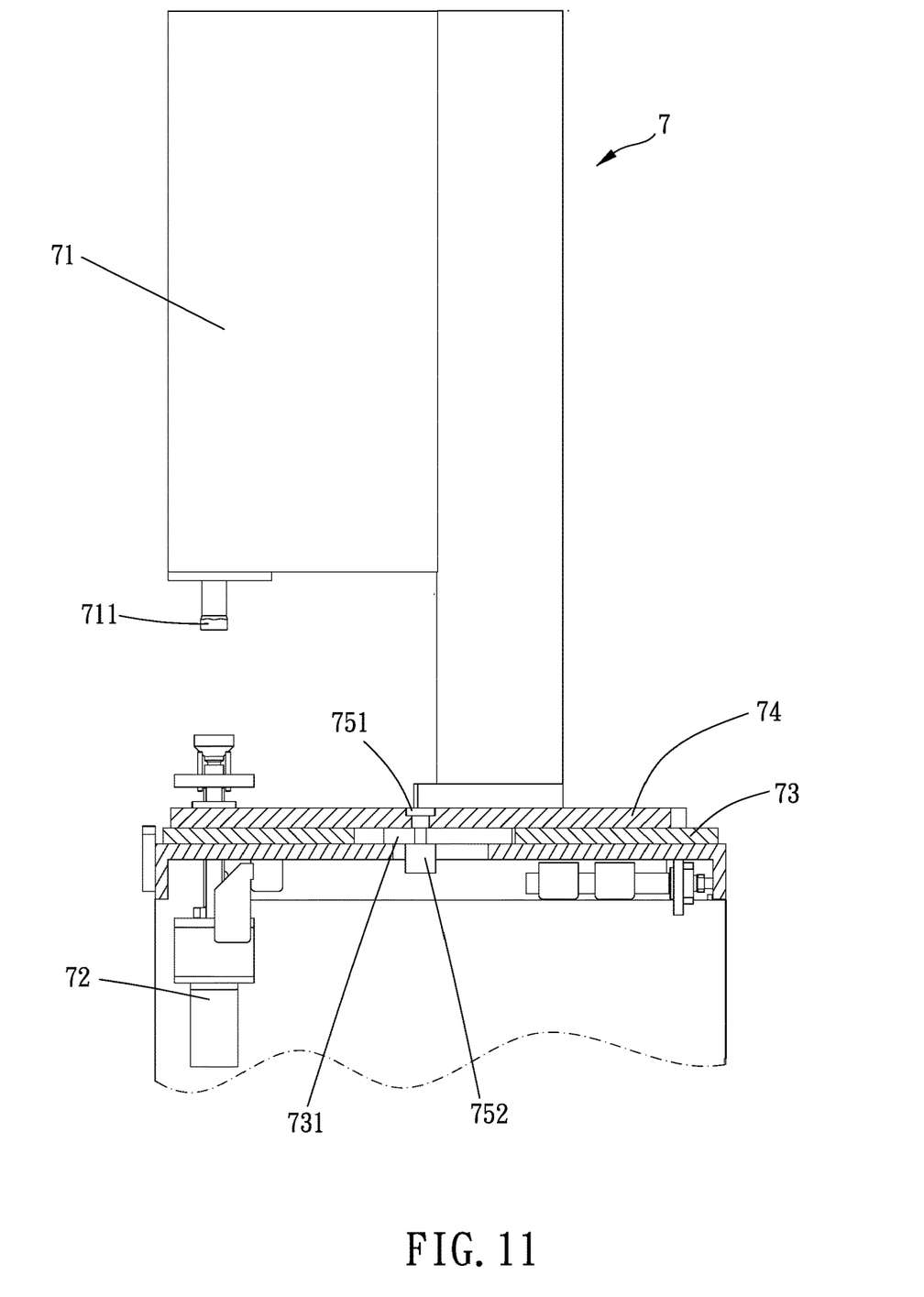
FIG. 11 and FIG. 12 are lateral view of operation showing a welding device of the present invention.
Figure 12:
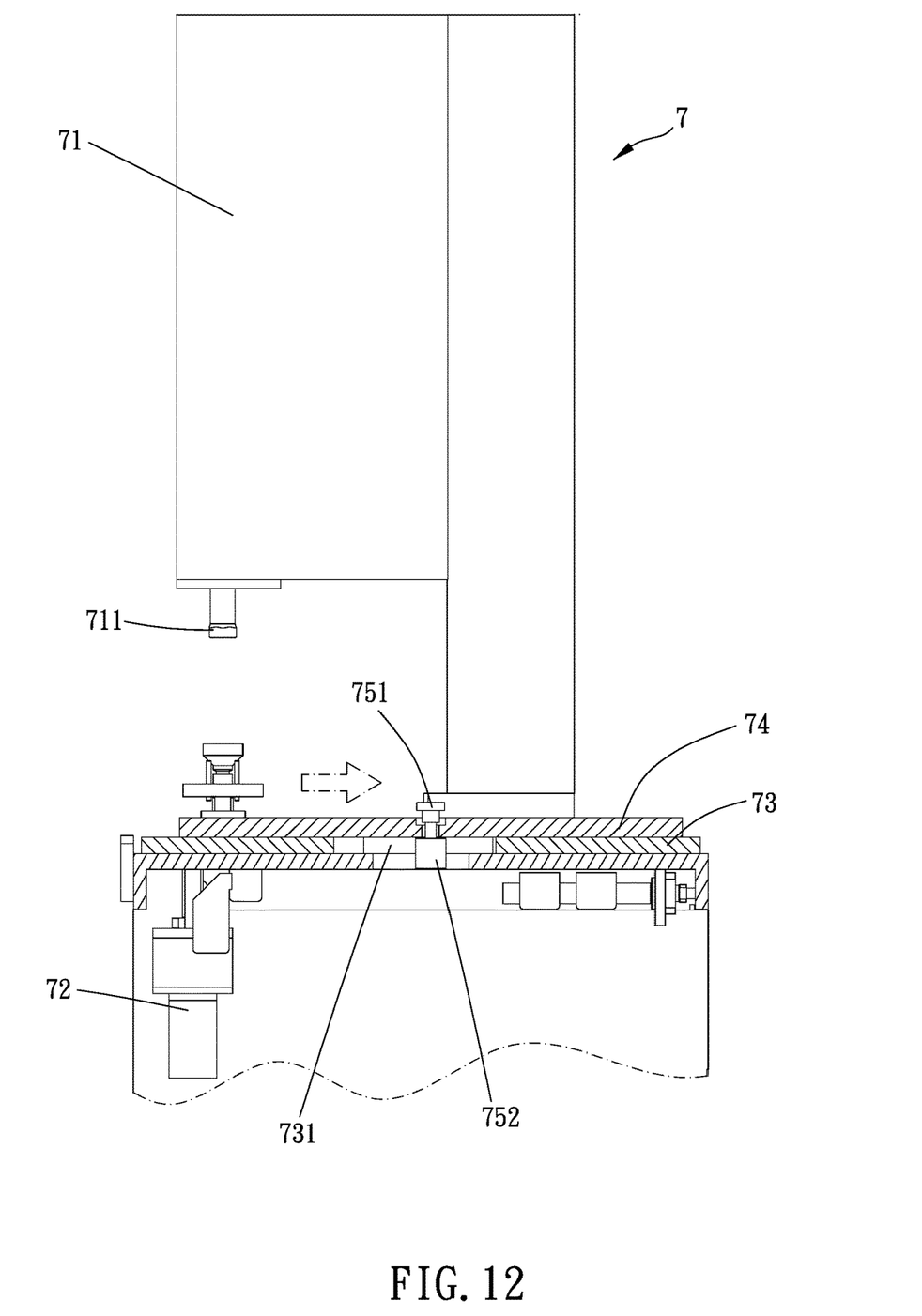

Preferably, the driving assembly 6 has a plurality of sensors 66 at different heights, as shown in FIG. 5 and FIG. 6. The supporting platform 3 has a plurality of subjects 39 arranged circularly, as shown in FIG. 7. Each of the subjects 39 corresponds to one of the sensors 66 at the same height. Due to the pairing of the subject 39 and the sensor 66, the angle of rotation of the supporting platform 3 can be precisely calculated. Thus, the process can be controlled automatically, and it's not necessary to arrange the sensors around the supporting platform 3 so that the number of the sensors can be reduced.

Please refer to FIG. 9 to FIG. 12, the welding device 7 includes a welding machine 71. The welding machine 71 has a welding head 711 for welding the two clamping members 41 of the fixing member 4 together. The welding device 7 further includes a second lifting device 72. The second lifting device 72 is adapted for moving the welding machine 71 along the rotation axis of the bearing 21.

Preferably, the welding device 7 includes a fixed plate 73 and a sliding plate 74. The welding machine 71 is fixed on the sliding plate 74. The sliding plate 74 is slidable with respect to the fixed plate 73 along a direction unparallel to the rotation axis of the bearing 21. Thus, the flexible cloths 9 in various radial sizes can be welded. The fixing members 4 can form circles in various sizes according to the sizes of the flexible cloth 9 in order to manufacture trampoline in different sizes.

Specifically, the sliding plate 74 is formed with a through hole 741. The fixed plate 73 is formed with a sliding groove 731 extending horizontally. An extension assembly 75 is arranged at a side of the fixed plate 73 remote from the sliding plate 74 and has an abutting member 751 which is extensible. The abutting member 751 is inserted into the sliding groove 731 and the through hole 741. When the abutting member 751 retracts toward the fixed plate 73, the abutting member 751 pushes the sliding plate 74 toward the fixed plate 73.

In the present embodiment, the through hole 741 has a stepped portion 742. An end of the abutting member 751 remote from the extension assembly 75 has a shape corresponding to the stepped portion 742. Thus, the abutting member 751 can hiddenly fasten the sliding plate 74 and the fixed plate 73.

Figure 16:
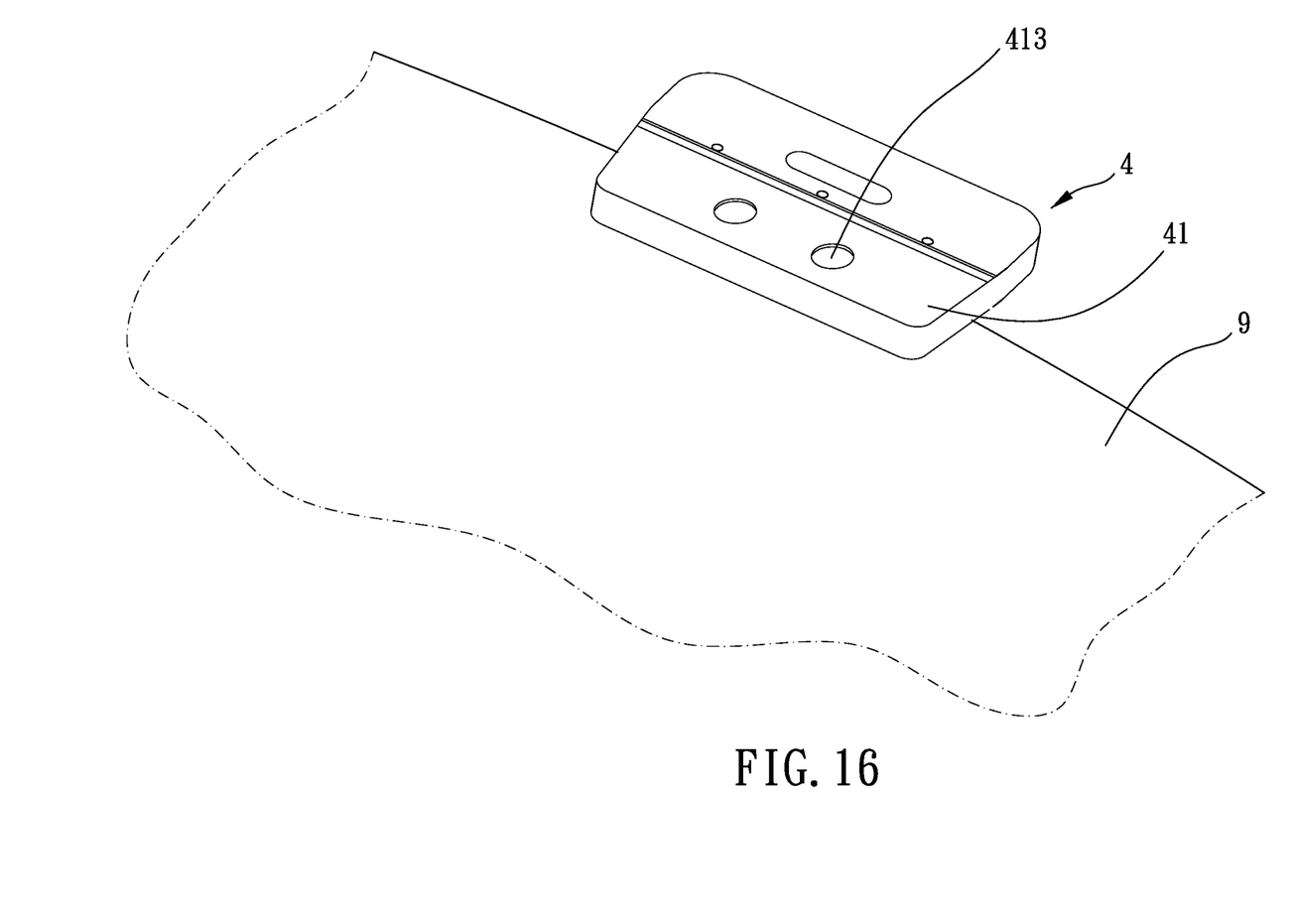
FIG. 16 is an illustration of the present invention when welding is completed.

As shown in FIG. 16, the welding device 7 welds the fixing member 4 and the flexible cloth 9 together preferably by ultrasonic welding. The clamping member 41 closer to the welding device 7 is formed with at least one circular recess 413 by the welding device 7 so that the two clamping members 41 and the flexible cloth 9 can be melted and fixed together firmly. In the present embodiment, two said circular recesses 413 are formed.

In conclusion, the present invention can improve the efficiency of manufacture of trampoline, and the manufacture can be processed automatically. In addition, the trampoline has a stronger structure.

What is claimed is:

1. An equipment for manufacturing trampoline, including:
   a rack;
   a rotation seat, having a bearing which is rotatable with respect to the rack;
   a supporting platform, connected to the bearing and being rotatable with the bearing when the bearing rotates;
   a plurality of fixing members, detachably disposed on the supporting platform and arranged circularly, each of the fixing members including two clamping members for clamping a flexible cloth therebetween;
   a driving member, arranged around the supporting platform and being linked-up with the supporting platform;
   a driving assembly, having a rotation motor, a rotation axle of the rotation motor being connected to the driving member so as to drive the driving member to rotate;
   at least one welding device, adapted for welding the two clamping members with the flexible cloth together;
   wherein the supporting platform further includes a ring-shaped platform plate and a plurality of supporting members, the supporting members are arranged radially, an inner end of each of the supporting members is connected to the bearing, an outer end of each of the supporting members is connected to the platform plate, the fixing members are disposed on the platform plate.

2. The equipment for manufacturing trampoline of claim 1, wherein a plurality of toothed portions are arranged around the supporting platform, the driving member is a chain, the chain surrounds and is engaged with the toothed portions, the rotation axle of the rotation motor has a driving gear, the driving gear is engaged with the chain.

3. The equipment for manufacturing trampoline of claim 2, wherein the driving gear is engaged with the chain at an inner side of the chain, the driving assembly further includes two driven gears, the driving gear is located between the two driven gears, a radial distance between the driving gear and the bearing is larger than a radial distance between each of the driven gears and the bearing, the two driven gears are engaged with the chain at an outer side of the chain respectively.

4. The equipment for manufacturing trampoline of claim 1, wherein a ring-shaped guiding face is formed on a top of the rack, a plurality of guiding posts facing the rack are disposed on the supporting platform and extend along a rotation axis of the bearing, each of the guiding posts has a rolling member at an end thereof, the rolling members abut against the guiding face respectively.

5. The equipment for manufacturing trampoline of claim 4, wherein a receiving space is formed at a center of the rack, the rotation seat is received in the receiving space, a plurality of connecting legs extending radially are arranged at a bottom of the rotation seat, the connecting legs are connected to the rack.

6. The equipment for manufacturing trampoline of claim 1, wherein the platform plate is assembled by a plurality of arc plates, any two adjacent ones of the arc plates are connected to one of the supporting members.

7. The equipment for manufacturing trampoline of claim 1, wherein the supporting platform includes a plurality of sector plates, each of the sector plates is sector-shaped, the sector plates form a circular plate, any two adjacent ones of the sector plates are connected to an end one of the supporting members remote from the platform plate, a radial size of the platform plate is larger than a radial size of the circular plate assembled by the sector plates.

8. The equipment for manufacturing trampoline of claim 7, wherein the supporting platform further includes a circular connecting plate, an outer periphery of the connecting plate is engaged with inner ends of the sector plates, the sector plates and the supporting members are connected to the bearing.

9. The equipment for manufacturing trampoline of claim 7, wherein the supporting platform further includes a linking member, the linking member surrounds the rotation seat, the linking member is connected to an end of the platform plate remote from the supporting members, a plurality of toothed portions are arranged around the linking member, the driving member is a chain, the chain surrounds and is engaged with the toothed portions, the rotation axle of the rotation motor has a driving gear, the driving gear is engaged with the chain.

10. The equipment for manufacturing trampoline of claim 9, wherein the linking member has a plurality of connecting members, the connecting members extend along a rotation axis of the bearing and bend radially to abut against and connect to the platform plate.

11. The equipment for manufacturing trampoline of claim 1, wherein the supporting platform has a plurality of jigs, the jigs are arranged circularly, at least one pin member is inserted through the two clamping members of the fixing member into the jigs.

12. The equipment for manufacturing trampoline of claim 1, wherein the driving assembly has a plurality of sensors at different heights, the supporting platform has a plurality of subjects arranged circularly, each of the subjects corresponds to one of the sensors at the same height.

13. The equipment for manufacturing trampoline of claim 1, wherein the welding device includes a welding machine, the welding machine has a welding head for welding the two clamping members of the fixing member together.

14. The equipment for manufacturing trampoline of claim 13, wherein the welding device includes a fixed plate and a sliding plate, the welding machine is fixed on the sliding plate, the sliding plate is slidable with respect to the fixed plate along a direction unparallel to the rotation axis of the bearing.

15. The equipment for manufacturing trampoline of claim 14, wherein the sliding plate is formed with a through hole, the fixed plate is formed with a sliding groove extending horizontally, an extension assembly is arranged at a side of the fixed plate remote from the sliding plate and has an abutting member which is extensible, the abutting member is inserted into the sliding groove and the through hole; when the abutting member retracts toward the fixed plate, the abutting member pushes the sliding plate toward the fixed plate.

16. The equipment for manufacturing trampoline of claim 15, wherein a plurality of toothed portions are arranged around the supporting platform, the driving member is a chain, the chain surrounds and is engaged with the toothed portions, the rotation axle of the rotation motor has a driving gear, the driving gear is engaged with the chain; the driving gear is engaged with the chain at an inner side of the chain, the driving assembly further includes two driven gears, the driving gear is located between the two driven gears, a radial distance between the driving gear and the bearing is larger than a radial distance between each of the driven gears and the bearing, the two driven gears are engaged with the chain at an outer side of the chain respectively; a ring-shaped guiding face is formed on a top of the rack, a plurality of guiding posts facing the rack are disposed on the supporting platform and extend along a rotation axis of the bearing, each of the guiding posts has a rolling member at an end thereof, the rolling members abut against the guiding face respectively; a receiving space is formed at a center of the rack, the rotation seat is received in the receiving space, a plurality of connecting legs extending radially are arranged at a bottom of the rotation seat, the connecting legs are connected to the rack; the platform plate is assembled by a plurality of arc plates, any two adjacent ones of the arc plates are connected to one of the supporting members; the supporting platform includes a plurality of sector plates, each of the sector plates is sector-shaped, the sector plates form a circular plate, any two adjacent ones of the sector plates are connected to an end one of the supporting members remote from the platform plate, a radial size of the platform plate is larger than a radial size of the circular plate assembled by the sector plates; the supporting platform further includes a circular connecting plate, an outer periphery of the connecting plate is engaged with inner ends of the sector plates, the sector plates are the supporting members are connected to the bearing; the supporting platform further includes a linking member, the linking member surrounds the rotation seat, the linking member is connected to an end of the platform plate remote from the supporting members, the toothed portions are arranged around the linking member; the linking member has a plurality of connecting members, the connecting members extend along the rotation axis of the bearing and bend radially to abut against and connect to the platform plate; the supporting platform has a plurality of jigs, the jigs are arranged circularly, at least one pin member is inserted through the two clamping members of the fixing member into the jigs; the driving assembly has a plurality of sensors at different heights, the supporting platform has a plurality of subjects arranged circularly, each of the subjects corresponds to one of the sensors at the same height; each of the two clamping members of the fixing member includes a clamping portion and a positioning portion which are integrally connected, the at least one pin member is inserted through the positioning portions of the two clamping members, a face of each of the clamping portions facing the other one of the clamping portion is formed with a wavy structure, the through hole has a stepped portion, an end of the abutting member remote from the extension assembly has a shape corresponding to the stepped portion.

17. A method for manufacturing a trampoline, using the equipment for manufacturing trampoline of claim 1, including steps of:
- preparing the flexible cloth and placing the flexible cloth on the supporting platform, clamping a fringe of the flexible cloth by the two clamping members of each of the fixing members;
- the rotation motor driving the supporting platform to rotate by the driving member to make the welding device correspond to one of the fixing members, the fixing member being welded to connect the two clamping members and the flexible cloth together;
- wherein the welding device welds the fixing member and the flexible cloth together by ultrasonic welding, one of the clamping members closer to the welding device is formed with at least one circular recess by the welding device.

* * * * *